United States Patent [19]
Graf et al.

[11] Patent Number: 6,035,735
[45] Date of Patent: Mar. 14, 2000

[54] DEVICE FOR CONTROLLING AN AUTOMATIC TRANSMISSION OF A MOTOR VEHICLE

[75] Inventors: Friedrich Graf; Frank Lohrenz, both of Regensburg; Werner Hauptmann, Höhenkirchen; Kai Heesche, München, all of Germany

[73] Assignee: Siemens Aktiegesellschaft, Munich, Germany

[21] Appl. No.: 09/138,351

[22] Filed: Aug. 21, 1998

[30] Foreign Application Priority Data

Aug. 21, 1997 [DE] Germany ............... 197 36 406

[51] Int. Cl.$^7$ ............... F16H 59/08; F16H 59/44; F16H 59/54
[52] U.S. Cl. ............... 74/335; 74/336 R; 701/52
[58] Field of Search ............... 74/335, 336 R; 701/52, 65

[56] References Cited

U.S. PATENT DOCUMENTS

| | | | |
|---|---|---|---|
| 4,517,646 | 5/1985 | Magnusson et al. | 701/52 X |
| 4,645,045 | 2/1987 | Takefuta | 701/52 X |
| 4,815,341 | 3/1989 | Ohkubo et al. | 477/906 X |
| 5,179,867 | 1/1993 | Sakakibara et al. | 74/335 |
| 5,197,344 | 3/1993 | Maier et al. | 74/335 |
| 5,393,275 | 2/1995 | Okada et al. | 74/335 X |
| 5,425,686 | 6/1995 | Grange | 74/335 X |
| 5,509,322 | 4/1996 | Anderson et al. | |
| 5,520,066 | 5/1996 | Tueri | 74/484 R X |
| 5,527,234 | 6/1996 | Kroeger | 74/335 X |
| 5,682,789 | 11/1997 | DeCrouppe et al. | 74/335 |
| 5,799,539 | 9/1998 | Haase | 74/335 X |
| 5,823,052 | 10/1998 | Nobumoto | 74/335 |
| 5,873,802 | 2/1999 | Tabata et al. | 477/96 |
| 5,882,277 | 3/1999 | Iizuka | 701/52 X |

FOREIGN PATENT DOCUMENTS

| | | |
|---|---|---|
| 0 467 773 A1 | 1/1992 | European Pat. Off. . |
| 0 685 664 A2 | 12/1995 | European Pat. Off. . |
| 0 766 024 A2 | 4/1997 | European Pat. Off. . |
| 32 01 440 A1 | 9/1983 | Germany . |
| 36 26 100 A1 | 2/1987 | Germany . |
| 39 41 665 A1 | 6/1991 | Germany . |
| 42 17 773 A1 | 12/1993 | Germany . |
| 43 11 852 A1 | 9/1994 | Germany . |
| 43 11 886 A1 | 10/1994 | Germany . |
| 43 32 265C1 | 5/1995 | Germany . |
| 61-169629 | 10/1986 | Japan . |
| 62-41954 | 3/1987 | Japan . |
| 2 282 195 | 3/1995 | United Kingdom . |

OTHER PUBLICATIONS

German Utility Model DE 295 13 950 U1, dated Feb. 20, 1997, gear shift for a motor vehicle.

International Application WO 97/01820 (Issa), dated Jan. 16, 1997.

Derwent World Patents Index, DE 3201440 Abstract, Sep. 1983, Derwent–Acc–No: 1983–759343.

*Primary Examiner*—Charles A. Marmor
*Assistant Examiner*—Scott Lund
*Attorney, Agent, or Firm*—Herbert L. Lerner; Laurence A. Greenberg

[57] ABSTRACT

The device contains an electronic control system, which, in an automatic mode, automatically determines the transmission ratio in dependence of an operating condition, and contains selector devices, which, in the automatic mode, determine the driving stages of the transmission control and, in a manual mode, change the transmission ratio in steps. After a manual selection of the transmission ratio, driving and operating situations in which the automatic mode of the control system is desirable are detected and, if such a situation is detected, a return circuit causes the electronic control system to return to the automatic mode.

22 Claims, 7 Drawing Sheets

| FIG.6A |
| FIG.6B |
| FIG.6C |

DEVICE FOR CONTROLLING AN AUTOMATIC TRANSMISSION OF A MOTOR VEHICLE

BACKGROUND OF THE INVENTION

1. Field of the Invention

The invention relates to a device for controlling an automatic transmission of a motor vehicle. In conventional transmission control systems—for example for automatic transmissions, automated manual shift transmissions, stepless or CVT transmissions—the gear or the gear ratio is automatically selected and set as a function of defined input variables, as for example the gas pedal position and the vehicle speed.

Recently, the driver has to an increasing extent been given the option to influence the gear decision of the control device manually by means of a selector device. This may take place, for example, by means of displacing a selector lever, which is usually arranged on the central console of the motor vehicle, into a "manual" shift gate provided specially for this purpose and is arranged in parallel with the usual selector lever gate for automatic transmissions having the positions "P-R-N-D".

By displacing the selector lever into this additional manual shift gate, the driver leaves the automatic mode of the transmission control system, that is to say the automatic selection of the gear or ratio, in order to set the desired gear in a so-called manual mode of the transmission control system. Thus, by means of pushing the selector lever forward, in each case an upward shift is carried out, and by pushing the selector lever backward, a downward shift is carried out. This intervention option is intended to improve the acceptance of the automatic transmission by drivers who are used to manual transmissions. If the driver wishes to use the automatic mode of the vehicle again, he has to leave the additional shift gate, that is to say he has to displace the selector lever into the "P-R-N-D" shift gate (cf. German Patent DE 43 32 265 C1). An additional central shift gate of that prior art arrangement simply replaces the selector lever positions for the driving stages D1, D2 and so on of conventional automatic transmission control systems, in which a step by step limitation of the shifting by one gear in each case is predefined by the driver.

A disadvantage is that the driver is forced to make a definite decision for one of the driving modes. A change between the automatic mode and the manual mode must thereby be effected deliberately by the driver—by displacing the selector lever. In addition, the manual gate, that is to say the purely manual control of the transmission in the manual gate, has the particular disadvantage that a learning process for matching the adaptive transmission control system to the driver's inputs is not possible. Such learning processes presuppose that, in the automatic mode, the driver can also intervene manually, which defines the "ideal shifting behavior" to modify the adaptive transmission control system. For this purpose, the automatic mode and the option for manual intervention must so to speak be provided simultaneously.

An automatically shifting transmission (cf. German Published, Non-Prosecuted Patent Application DE 43 11 886 A1) has a driving stage lever for an automatic mode of operation and a rocker for a manually actuated mode of operation. The transmission control system changes from the automatic mode into the manual or driver-actuated mode of operation if the driving stage lever is moved into a position M or if the rocker is used to output a shift signal of a predefined duration. The driver-actuated mode of operation is terminated if the driving stage lever is moved into the M position again, or if an upward shift signal of a predefined duration is provided. The driver actuated mode may also be terminated after having been active for predefined time period.

A selector device for an automatic transmission (cf. U.S. Pat. No. 5,509,322) has a longitudinal gate for a selector lever for the automatic mode and, at one end of this longitudinal gate, two lateral lever positions for manually shifting up or down by one gear. An automatic return into the automatic mode is not provided.

Another selector device for an automatic transmission (cf. European Patent Disclosure EP 0 467 773 A1) contains a longitudinal gate for a selector lever for the automatic mode and a transverse gate for manually shifting up or down by one gear, the transverse gate is arranged at a position M located between the positions "D" and "1" of the longitudinal gate. A manual shift command is not executed if it would result in a stalling or over-revving of the engine.

In the case of a further shifting device for an automatic transmission (cf. European Patent Disclosure EP 0 685 664 A2), a selector lever can be pivoted in a first shift gate for an automatic mode, this gate being connected via a transverse gate to an H-shaped shift control pattern for a manual mode. At the point of intersection of the shift gate with the shift control pattern, a further shifting program is activated. This shifting program can be activated both, with the selector lever coming from the shift gate and from the shift control pattern. A manual shift signal is executed only if the target gear lies in the permissible range of engine speed.

SUMMARY OF THE INVENTION

It is accordingly an object of the invention to provide a device for controlling an automatic transmission which overcomes the above-mentioned disadvantages of the heretofore-known transmission control devices of this general type and which relieves the driver of the need to change back into the automatic mode when required, and which increases the safety and the driving convenience of a motor vehicle.

With the foregoing and other objects in view there is provided, in accordance with the invention, a device for controlling an automatic transmission of a motor vehicle, comprising:

an electronic control system, selectively operable in an automatic mode and a manual mode, for automatically determining a transmission ratio in the automatic mode as a function of an operating condition;

a first selector device for determining a driving stage of a transmission control in the automatic mode;

a second selector device for changing the transmission ratio step-wise in the manual mode; and a return circuit for detecting at least one of a driving situation and an operating situation in which the automatic mode is desirable after a manual selection of the transmission ratio, and for switching the electronic control system into the automatic mode if the situation is detected.

A transmission control in accordance with the invention includes an electronic control system, by means of which, in an automatic mode, the ratio of the transmission is automatically defined as a function of the respective operating state; and a first selector device, with which, in the automatic mode, the driving stages of the transmission control system (P, R, N, D) are defined, and a second selector device, with which, in a manual mode, the ratio of the transmission is changed in steps. By means of a return circuit, after a manual selection of the ratio of the transmission, driving and operating situations are detected in which the automatic mode of the control system is desirable and, if such a situation is detected, the electronic control system is transferred into the automatic mode.

Such driving situations are, for example, too low or too high an engine speed, long-lasting or frequent actuation of the brakes, extreme situations in terms of driving dynamics, such as, for example, the rear of the vehicle swerving, and so on. Corresponding operating situations are, for example, a driver who is busy with the operation of a navigation instrument or a radio receiver, a driver who is braking very sharply, and so on.

The invention has the particular advantage that the capabilities of an adaptive automatic transmission control system can be fully utilized for matching the vehicle's driving behavior to a driver's preference (economic, sporty, etc. mode of driving) or to driving situations (by detecting the load, brake assistance etc.). The advantages are, for example, gear selection for optimizing fuel consumption, a gain in driving convenience as the result of generally relieving the load on the driver, and aiding the driver in unclear or critical driving situations, for example in city traffic and, as a result of relieving the load on the driver, when he is operating additional instruments and devices in the vehicle (radio, navigation device etc.).

A further advantage of the invention is that it makes it possible to use very simple input elements. These result in considerable savings compared with known transmission control systems, in which the "D" position for automatic shifting always has to be left or exited by way of a mechanical device, which requires a considerable expenditure.

In accordance with a further feature of the invention, the first selector device has a selector lever which is movable in a shift gate along a given axis, the second selector device has two push-buttons, arranged on either side of a "D" position of the first selector device, and the push-buttons detect deflections of the selector lever in a direction perpendicular to the given axis.

In accordance with another feature of the invention, the first selector device has a selector lever which is movable in a shift gate along a given axis, the second selector device has two push-buttons, arranged on either side of a "D" position of the first selector device, and the push-buttons detect deflections of the selector lever in a direction parallel to the given axis.

In accordance with yet another feature of the invention, the first selector device and the second selector device are combined in a single selector device having two push-buttons located on a steering wheel.

In accordance with a further feature of the invention, the return circuit performs a return to the automatic mode if one of too low and too high an engine speed, indicated by a lower speed threshold and a upper speed threshold, respectively, is detected.

In accordance with a further feature of the invention, the return circuit prevents a return to the automatic mode, if the upper speed threshold is reached and a full-load demand from the driver is present.

In accordance with yet a further feature of the invention, the return circuit performs a return to the automatic mode if a sustained or a frequent actuation of a brake is detected.

In accordance with another feature of the invention, the return circuit performs a return to the automatic mode if an extreme situation in terms of driving dynamics is detected.

In accordance with a further feature of the invention, the return circuit performs a return to the automatic mode if a change over time in the gas pedal actuation exceeding a predefined value is detected.

In accordance with yet another feature of the invention, the return circuit performs a return to the automatic mode if an activity demanding an increased attention of the driver is detected.

Other features which are considered as characteristic for the invention are set forth in the appended claims.

Although the invention is illustrated and described herein as embodied in a device for controlling an automatic transmission of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 6 (FIG. 6A, FIG. 6B, and FIG. 6C) is a flow diagram of a control program of the device according to FIG. 1, and FIG. 7 (FIG. 7A, FIG. 7B) is a further flow diagram of a control program of the device according to FIG. 1.

DESCRIPTION OF THE PREFERRED EMBODIMENTS

Figure 1:
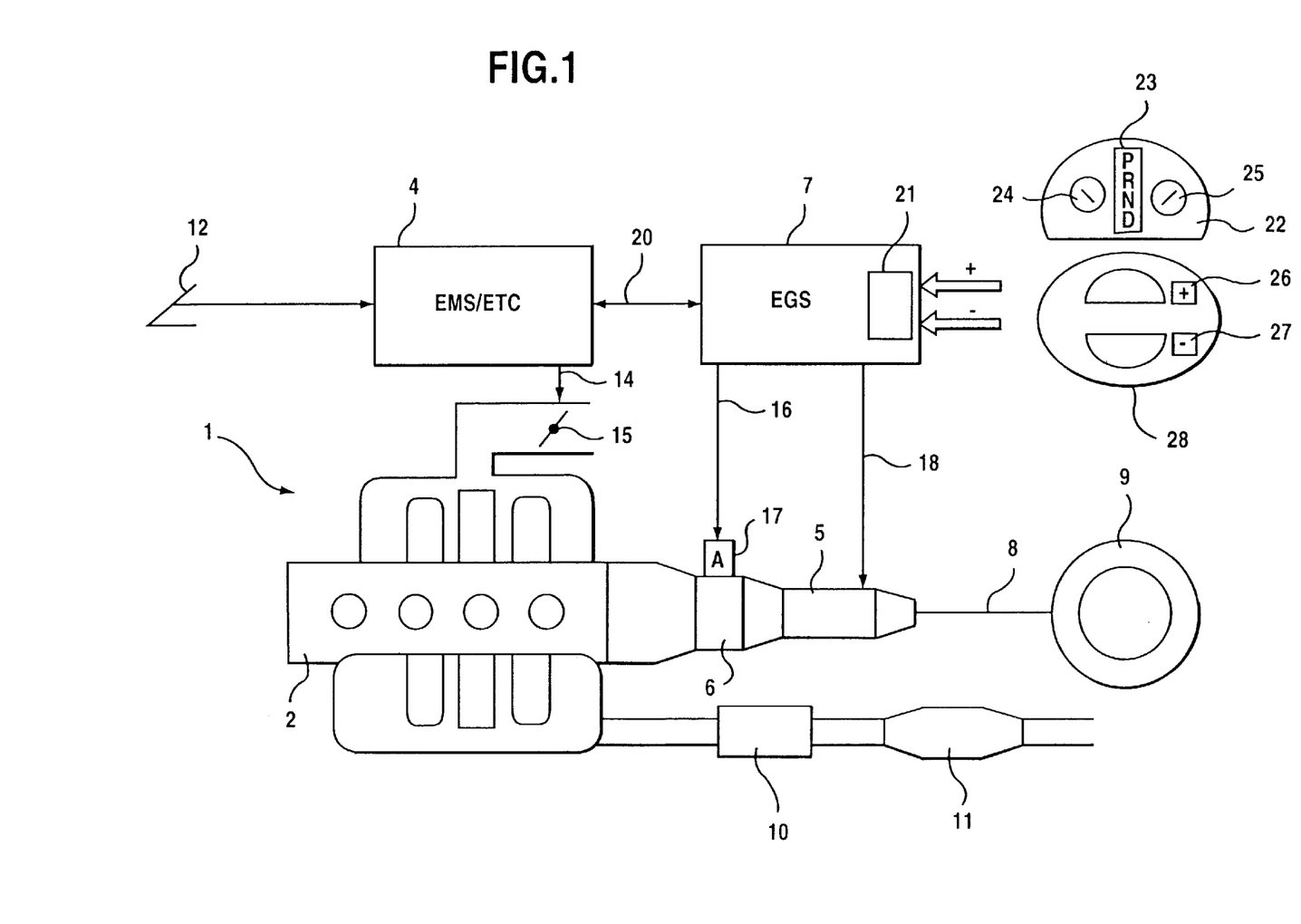
FIG. 1 is a schematic view of a drive train of a motor vehicle with a device for controlling an automatic transmission in accordance with the invention.

Referring now to the figure of the drawings in detail and first, particularly, to FIG. 1 thereof, there is schematically illustrated a drive train 1 of a motor vehicle which includes: an engine 2 with an electronic engine control system EMS 4, which can also perform the function of an electronic traction control ETC, an automatic transmission 5 having a torque converter 6 and an electronic transmission control system 7. The driving of the wheels is indicated by a cardan shaft 8 and a driven wheel 9, the exhaust-gas system by a catalytic converter 10 and a silencer 11.

Via a gas pedal 12, the driver communicates his wishes to the engine control system 4, which in turn controls the engine accordingly. This is indicated by a signal line 14, which adjusts a throttle 15. The control of the injection time and the control of the quantity of fuel injected into the engine are not illustrated, since they are also generally known.

Via a signal line 16, the transmission control system controls a lock-up clutch 17 for the torque converter 6 and, via a signal line 18, controls the ratio of the transmission 5. The engine control system 4 and the transmission control system 7 are connected to each other by bidirectional signal and control lines 20, for example in the form of a data bus, and, via these data lines, exchange information which is necessary for the convenient and economic driving operation of the motor vehicle.

The transmission control system 7 is provided with a return circuit 21, which receives manual shift commands input by the driver via an operating device, and signals which describe the driving state of the motor vehicle and evaluates them. The function of the return circuit will be explained in detail below, in particular with reference to FIG. 6.

An indicator 23 provided in a dashboard 22 of the motor vehicle indicates to the driver the respective driving stage of the electronic or automatic transmission control system 7. The indicator 23 may be a multifunction indicator, if the vehicle is provided with one of these. The additional expenditure for the indicator is then limited to merely controlling the indicator by the program of the transmission control system 7. Further indicated in the drawing are a speedometer instrument 24 and a tachometer 25.

The driver transmits the commands to the transmission via an operating device in the form of two switches or rockers: a "+" switch 26 for shifting up and a "−" switch 27 for shifting down. These switches 26 and 27 are provided, for example, on the steering wheel 28 of the motor vehicle. On the one hand, the operating unit enables the selection of the automatic mode (P, R, N, D) and, on the other hand, a manual mode with gear determination or gear control by hand. The manner in which the return circuit 21 distinguishes between the two modes will be explained further below with reference to FIG. 7.

Since, for this embodiment of the invention, the driver is also able to determine or control the automatic mode of the transmission via the switches 26, 27, a selector lever is no longer needed, so that the resulting operating device in its simplest form is merely two switches or push-buttons. If however, for reasons of a convenient operation, a selector lever is desired, it can be provided for the input in the automatic mode. The switches 26, 27 are then used only for the input of shift commands in the manual mode.

Figure 2:
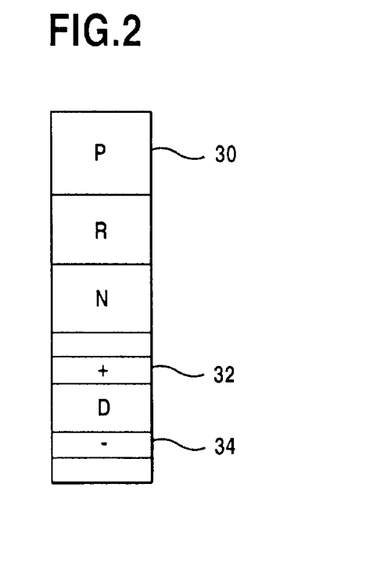
FIG. 2 is a schematic view of the shifting pattern of a selector lever of the device for controlling an automatic transmission as shown in FIG. 1.
Figure 3:
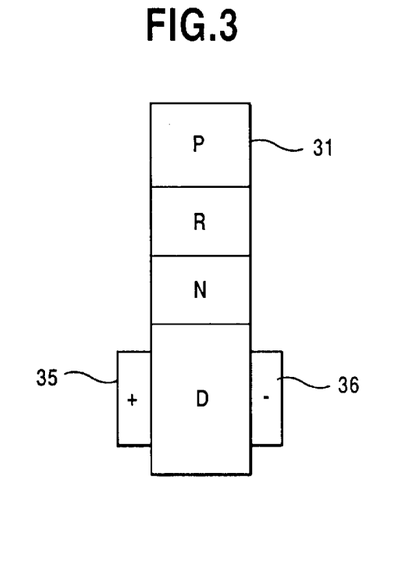
FIG. 3 is a schematic view of a further example of a shifting pattern of the selector lever.

Two exemplary embodiments of shift gates 30 and 31 are illustrated schematically in FIGS. 2 and 3. They presuppose a selector lever and have the usual selector lever positions P for park, R for reverse, N for neutral and D for the normal forward travel of the motor vehicle. Provided in the shift gate 30 in front of and behind the D position are a switching contact 32 and a switching contact 34, with which the driver can request upward or downward shifts, that is to say they have a "+" and "−" function. These switching contacts or switching positions, which can also be implemented as push-buttons or rockers on the selector lever, are designed as quite simple electric switches, with which in each case only one signal is generated and is interpreted by the transmission control system as an upward or downward shift signal.

As soon as the driver actuates one of these switching contacts 32, 34—or moves the selector lever into the corresponding position—the transmission carries out an upward or downward shift each time. This means that these switching contacts 32 and 34 constitute the manual mode of the transmission control system. The gears are selected and engaged in an automatic transmission of the planetary gear type or in an automated manual shift gearbox in accordance with the commands of the driver. In the case of a CVT transmission, the transmission ratio is influenced via these switching contacts.

The switches or rockers 26, 27 and the shift gates 30, 31, 41, together with the selector lever 40 that can move in the latter and the switching contacts or switching positions 32, 34 or 35, 36, are referred to here in combination as a selector device.

Since the return into the automatic mode—as will be explained below—is carried out automatically according to the invention, no mechanical or electromechanical device or apparatus is needed to change from the automatic mode into the manual mode and to return again into the automatic mode. Such otherwise necessary devices, which as a rule comprise two or more shift gates that are located next to each other and are connected to each other by a passage, are extremely expensive to produce, in particular due to the required accuracy of manufacture, the large number of electric contacts and the requirements for reliability.

Furthermore, the device in accordance with the invention does not require the driver to make any kind of decision, nor to execute any manipulations in order to return into the automatic mode.

In the case of the shift gate 30, the "+" switching contact (or the switching position) 32 is arranged behind the D position of the shift gate, and the "−" switching contact (or the switching position) 34 is arranged in front of the D position of the shift gate; in the case of the shift gate 31, a "+" switching contact 35 and a "−" switching contact 36 are arranged laterally beside the D position of the shift gate. The requests to shift up and down are reasonably made during the normal driving of the motor vehicle, that is to say with the selector lever in the D position. In the case of a manual gear selection, depending on the desired shift, the position "+" (for an upward shift) or the position "−" (for a downward shift) are assumed or occupied briefly.

In the case of the arrangement according to FIG. 2, it is necessary to prevent the selector lever from being inadvertently moved into the position "N" instead of into the position "+". This can be achieved by an increased force along the movement direction of the selector lever being needed to pass into the "N" position. This may be achieved easily in design terms, by using an additional spring for example. In the case of the arrangement according to FIG. 3, a selector lever 40 (cf. FIG. 4) is brought back again into its central position by a restoring spring (not illustrated) after the switching contacts 35 or 36 have been actuated.

It is possible to dispense with a selector lever entirely if use is made of the two push-buttons of the device according to FIG. 1, with which the driver controls all the shifting positions according to FIG. 2 by making an electric contact. In this case, it is necessary to indicate, via the indicator 23 in the driver's field of view, the respective shift position, in order to prevent, for example, the position "N" being confused with the position "+". This can be achieved by the push-button having to be actuated over a longer time period in order to pass into the "N" position.

Figure 4:
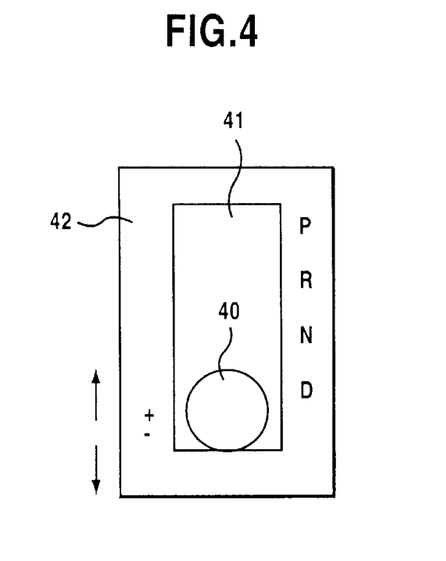
FIG. 4 is a schematic top view of the selector lever of the device shown in FIG. 1.
Figure 5:
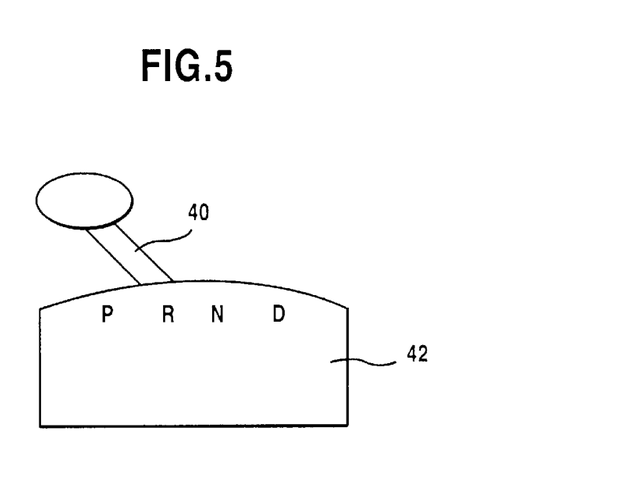
FIG. 5 is a schematic side view of the selector lever of the device shown in FIG. 1.

The selector lever 40, which is able to assume the positions that can be seen in FIG. 2, is illustrated in plan view in FIG. 4 and in a side view in FIG. 5. The selector lever 40 is moved or pivoted along a shift gate 41 in a shift control pattern 42 and, in so doing, occupies the positions D, N, R or P, which correspond to the driving stages of the automatic mode. For the manual mode, the selector lever 40, starting from the position D, is moved either into a "+" or into a "−" position. The selector device according to FIG. 4 corresponds to the scheme of FIG. 2.

An actuation of the switches 32, 34, 35 or 36 effects the entry into the manual mode. In the case of the exemplary embodiment according to FIG. 1, the switches 26 or 27 have to be actuated for this purpose. The return circuit 21 (see FIG. 1) then detects driving and operating situations in which it is desirable to return from the manual mode into the automatic mode of the transmission 5. After such a state has been detected, the return circuit 21 automatically transfers or switches the transmission control system 7 into the automatic mode. Such situations for a return to the automatic mode are detected, for example, with reference to the following conditions, which can be connected by means of "AND" or "OR" combinations:

(1) Leaving the manual mode if the engine speed rises above or falls below predefined engine speeds:
   shifting down in the case of a low-revving engine (engine stall)
   shifting up in the event of over-revving the engine: $n_{eng} > n_{eng,max}$
(2) As under (1), except that when the upper speed limit is reached and there is a full-load demand from the driver (e.g. gas pedal position >90%) the manual mode is not left by an automatic upward shift.
(3) As under (2), via a timer $T_2$ a manual upward shift command from the driver is not executed for a short time interval $T_{min}$ following an automatic upward shift.
(4) Time-controlled via timer $T_1$, return to the automatic mode:
   a) If no further manual actions are carried out, a return is made after a defined time interval $T_{max}$.
   b) If no further manual actions take place, a return is made after a time interval which depends on the shifting frequency $f_{shift}$ of the driver.
   c) In the event of an action by the driver to compensate the return to the automatic mode, the time span $T_{MAX}$ used in 4a) and 4b) is extended.
(5) Return in the case of detected and defined driving situations, e.g. driving in city traffic, which are registered by a driving situation detector.
   Detection of stop-and-go driving situations.
   After a continuous braking operation (time $T_B > T_{B,MAX}$) of high braking frequency ($f_B$), in order to aid the driver by automatically shifting down and to relieve the load on the operating brake.
(6) The presence of an extreme situation in terms of driving dynamics (traveling through extreme curves, brake or drive slip) with the constraint of ensuring safe driving behavior by means of appropriate automatic shifting.
(7) Detection of a defined acceleration request from the driver, e.g. detection of a high gas pedal gradient (start of an overtaking procedure, or kick-down detection).
   Ensuring the best possible driving performance with the automatic mode.
   Detection of a significant acceleration (overtaking, best possible driving output by the automatic mode) or deceleration (emergency braking) in the longitudinal direction of the vehicle (reducing the burden on the driver).
(8) Change into the automatic mode if external events are detected in which the burden on the driver should be reduced:
   e.g. using a car telephone,
   activation of a navigation or traffic control system,
   radio operating procedure.
(9) The gear selected by the driver corresponds to that gear which the automatic transmission control system would select, during a defined time interval $T_{G,MAX}$, measured via a timer T4.
(10) Change to the automatic mode in the event of inadmissible shift commands by the driver.
(11) Change to the automatic mode if the shift command which has triggered the change to the manual mode is compensated again by the driver by a further shift command within a short time interval.
(12) Change to the automatic mode if any shift command is compensated again by the driver by a further shift command within a short time interval.
(13) Change to the automatic mode if the driver selects the "+" or "−" position, measured by a timer T3, for a relatively long time span $T_{T,MAX}$ (manual return to the automatic mode by the driver).

Figures 6, 6A:
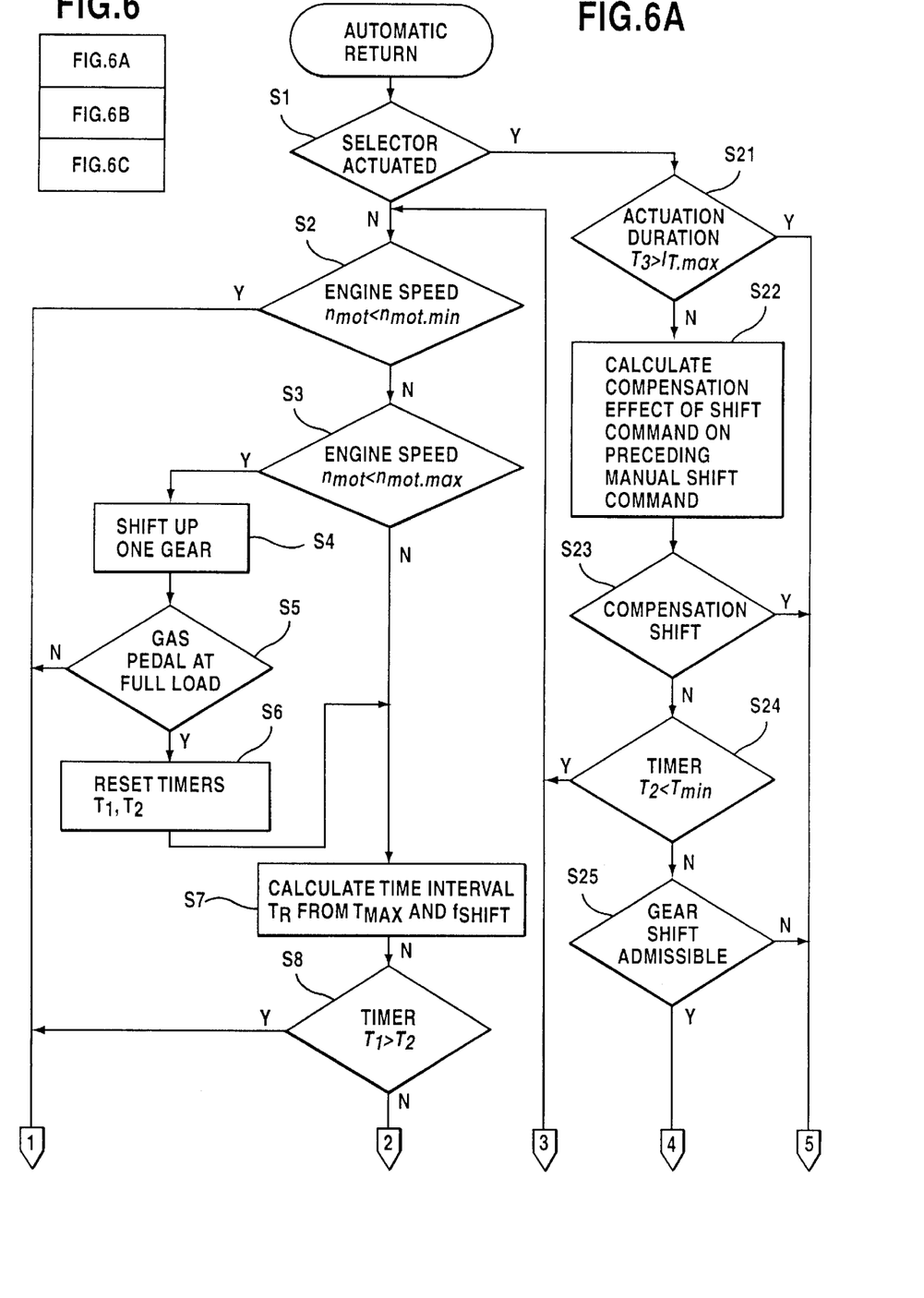

The program that can be seen from the flow diagram of FIG. 6 is executed by the return circuit 21 when the transmission control system is being returned automatically to the automatic mode. The program has the following steps which are designated below using S1 for the first step, S2 for the second step and so on.

Figure 6B:
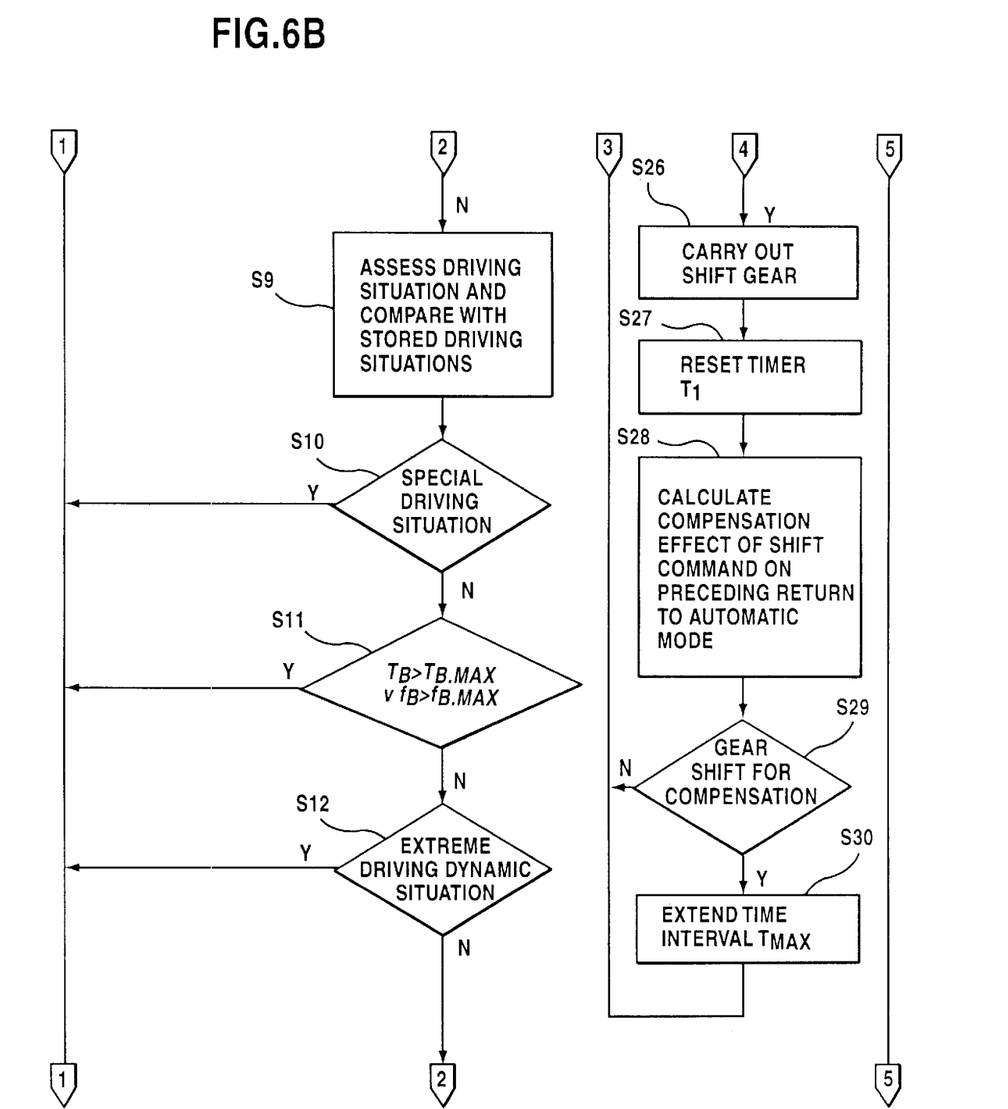
Figure 6C:
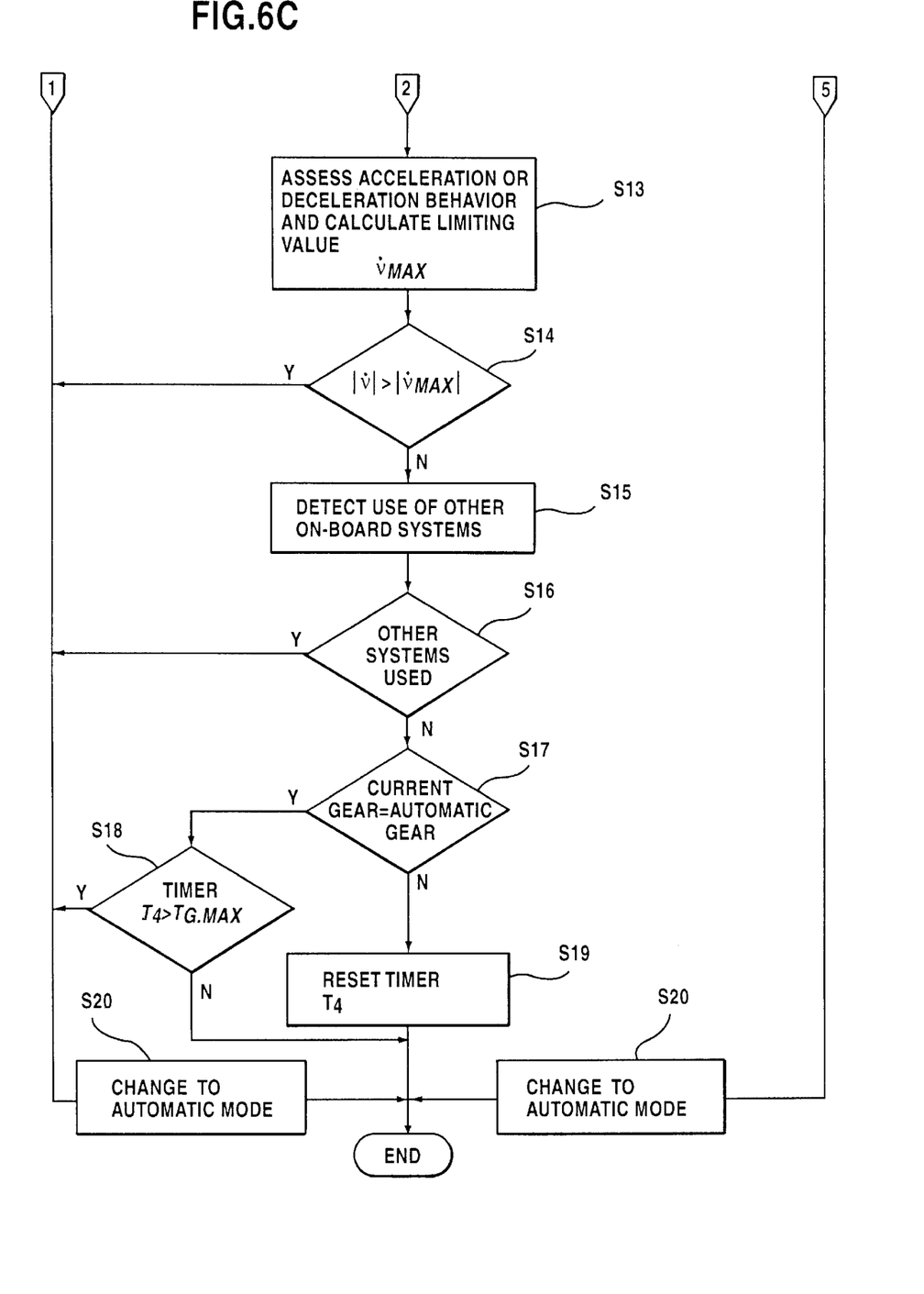

S1: A query is made as to whether the selector push-button has been actuated. If not, in a step S2: a query is made as to whether the engine speed is below a minimum value. If so, a change is made to the automatic mode and a jump is made to the end of the program. If not, in a step S3: a query is made as to whether the engine speed is above a predefined upper threshold or limiting value. If so, in a step S4: an upward shift by one gear is made, and in a step S5: a query is made as to whether the gas pedal is at full load. If not, a change is made to the automatic mode and a jump is made to the end of the program. If so, in a step S6: timers $T_1$, $T_2$ are reset and then, in a step which also follows if the answer to the query in step S3 is no, S7: a time interval $T_R$ is calculated from $T_{MAX}$ and $f_{shift}$. Then, in a step S8: a query is made as to whether the timer $T_1$ is greater then $T_R$. If so, a change is made to the automatic mode. If not, in a step S9: the driving situation is assessed and compared with stored driving situations. Then in a step S10: a query is made as to whether a special driving situation is present. If so, a change is made to the automatic mode. If not, in a step S11: a query is made as to whether $T_B$ is greater than $T_{B,MAX}$ and $f_B > f_{B,MAX}$. If so, a change is made to the automatic mode, and if not, in a step S12: a query is made as to whether an extreme situation in terms of driving dynamics (dynamics of vehicle movement) is present. If so, a change is made to the automatic mode, if not, in a step S13: the acceleration or deceleration behavior of the vehicle is assessed and a threshold $\dot{v}_{MAX}$ is calculated (FIG. 6b). After this, in a step S14: a query is made as to whether $|\dot{v}| > |\dot{v}_{MAX}|$. If so, a change is made to the automatic mode. If not, in a step S15: the use of other on-board systems is detected. Then, in a step S16: a query is made as to whether other on-board systems are being used by the driver. If so, a change is made to the automatic mode. If not, in a step S17: a query is made as to whether the current gear is equal to the gear selected by the automatic transmission control system. If so, in a step S18: a query is made as to whether the timer $T_4 \geq T_{G,MAX}$. If so, a change is made to the automatic mode and a jump is made to the end of the program. If not, a jump is likewise made to the end of the program. If the reply to the query of step S17: is no, then in a step S19: a timer $T_4$ is reset and a jump is then made to the step S20: i.e. the end of the program.

If the reply to the query in step S1, whether the selector push-button has been actuated, is yes, then in a step S21: a query is made as to whether the push-button actuation duration $T_3 > T_{T,MAX}$. If so, in a step S20: a change is made to the automatic mode. If not, in a step S22: the compensation effect of the shift command on the preceding manual shift command is calculated. In a step S23: a query is made as to whether a compensation shift is to be carried out. If so, a change is made to the automatic mode. If not, in a step S24: a query is made as to whether the timer $T_2 > T_{MIN}$. If so, a jump is made back to step S2. If not, in a step S25: a query is made as to whether a gear shift is admissible. If not, a change is made to the automatic mode. If so, in a step S26: a gear shift is carried out. After this, in a step S27: the timer $T_1$ is reset. After this, in a step S28: the compensation effect of the shift command on the preceding return to the automatic mode is calculated. Subsequently, in a step S29: a query is made as to whether the gear shift has taken place to compensate a return to the automatic mode, which was not desired by the driver. If not, a jump is made back to step S2. If so, in a step S30: the time interval $T_{MAX}$ is extended and a jump back to step S2 is likewise made.

As shown in FIG. 6, the program is therefore in each case terminated by a return or change to the automatic mode (S20) or by the resetting of the timer $T_4$ (S19).

Figure 7:
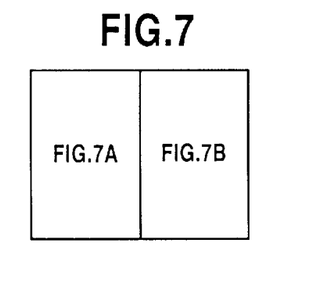
Figure 7A:
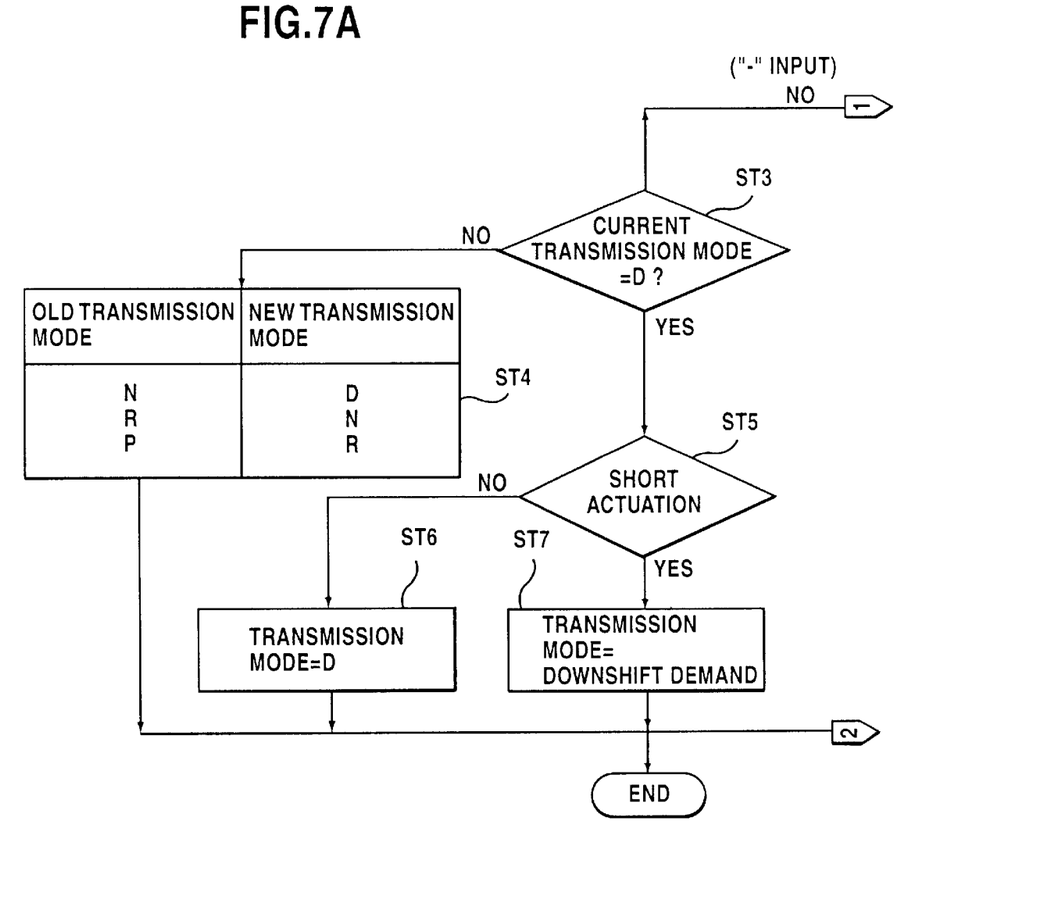
Figure 7B:
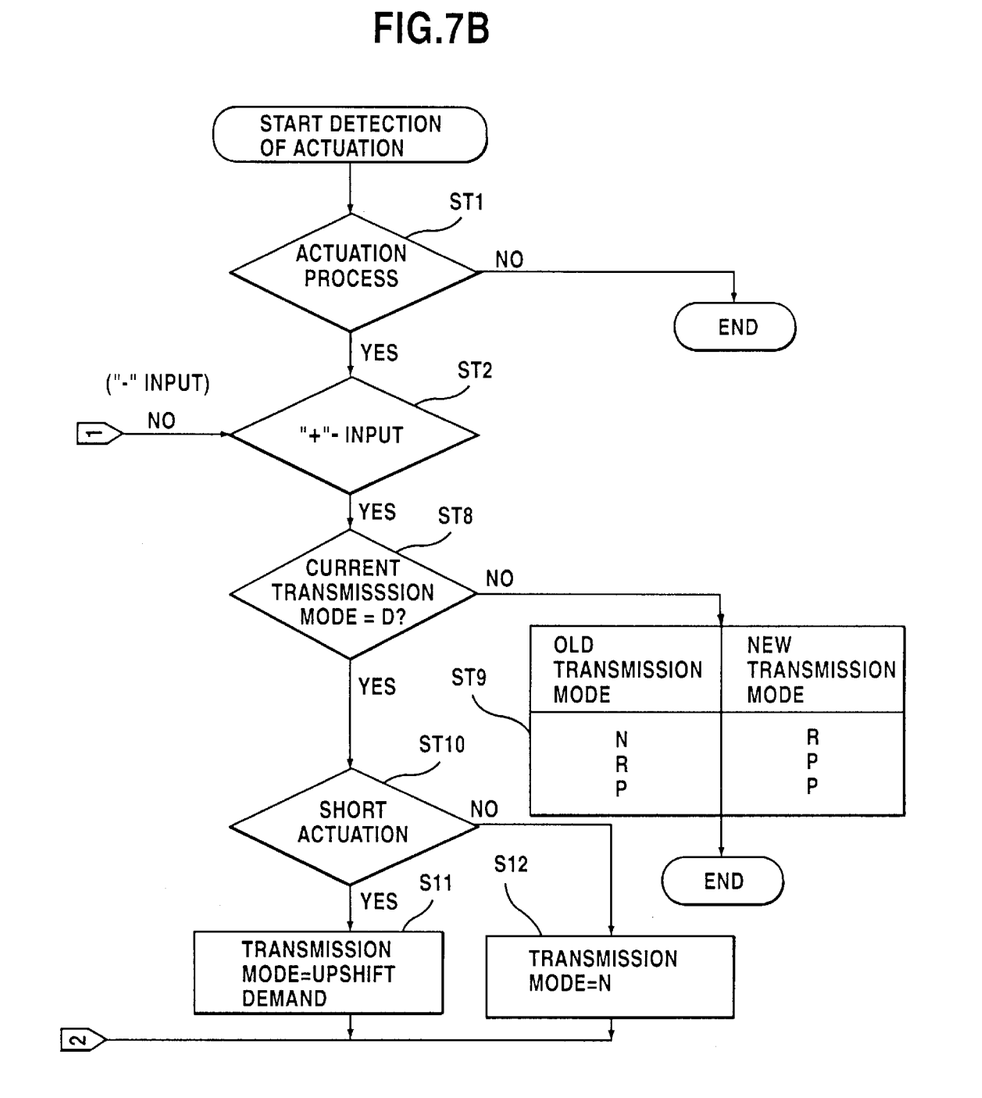

The program that is shown in the flow diagram of FIG. 7 is used for detecting actuations of the push-button or switching contacts 26 and 27 (cf. FIG. 1). It is used to distinguish between the predefinition (selection) of the automatic mode, on the one hand, and the manual mode, on the other hand. The program steps are designated here by ST1 for the first step, ST2 for the second step and so on. After the start of the push-button registration (detection), in a step ST1: a query is made as to whether there is a push-button operation. If not, a jump is made to the end of the program. If so, in a step ST2: a query is made as to whether there is a "+" input. If not, in a step ST3: a query is made as to whether the current transmission mode is "D". If not, in a step ST4: a change is made from the old transmission mode into a new transmission mode, specifically in the manner that can be seen from the table of step ST4. If the reply to ST3 is yes, then in a step ST5: a query is made as to whether there is a short push-button operation. If not, in a step ST6: it is established that the transmission mode is "D". If so, in a step ST7: it is established that the transmission mode corresponds to a desire to shift down. A change is made to the manual mode.

After the steps ST6 and ST7, a jump is made to the end of the program.

If the reply to the query of step ST2 is yes, then in a step

ST8: a query is made as to whether the current transmission mode is "D". If not, in a step ST9: the old transmission mode is replaced by a new transmission mode in each case, specifically in the manner that can be seen from the table of step ST9. After this, a jump is made to the end of the program. If the reply to the query ST8 is yes, then in a step ST10: a query is made as to whether there is a short push-button operation. If so, in a step ST11: it is established that the transmission mode corresponds to a desire to shift up. A change is made to the manual mode, and a jump is made to the end of the program. If not, in a step ST12: the transmission mode is established as "N" (for neutral=no load) and a jump is made to the end of the program.

The return circuit 21 of the device according to the invention thus ensures that the transmission control system is always returned to the automatic mode when it appears to be sensible based on the driving state of the motor vehicle and the behavior of the driver, such that this return or changeover is not demanding or burdening for the driver. In the automatic mode, the transmission is shifted automatically and also an adaptive improvement to the shift functions is carried out continuously.

On the other hand, it is possible for the driver at any time, if he so desires, to change directly into the manual shifting mode by actuating one of two simple push-buttons or switches. He does not need to concern himself with anything else. This clear improvement to the operability of the transmission, together with the simple and relatively uncomplicated detection of the selector lever position, constitutes a considerable improvement to the control of automatic transmissions. The reduced expenditure in the manufacture of the selector or operating device 23, 26, 27 is particularly advantageous in the case of automated manual shift transmissions, which, as a cost-effective variant or alternative to the conventional automatic transmissions, are also suitable for motor vehicles of the lower and middle price ranges, since these transmissions do not need a mechanical connection between a selector lever and the transmission.

We claim:

1. A device for controlling an automatic transmission of a motor vehicle, comprising:
   an electronic control system, selectively operable in an automatic mode and a manual mode, for automatically determining a transmission ratio in the automatic mode as a function of an operating condition;
   a first selector device for determining a driving stage of a transmission control in the automatic mode;
   a second selector device for changing the transmission ratio step-wise in the manual mode; and
   a return circuit for detecting, after a manual selection of the transmission ratio, if an engine speed reaches an upper speed threshold and preventing a return to the automatic mode, if the upper speed threshold is reached and a full-load demand from a driver is present.

2. The device according to claim 1, wherein said first selector device comprises a selector lever movable in a shift gate along a given axis, and wherein said second selector device comprises two push-buttons, disposed on either side of a "D" position of said first selector device, said push-buttons detecting deflections of said selector lever perpendicular to the given axis.

3. The device according to claim 1, wherein said first selector device comprises a selector lever movable in a shift gate along a given axis, and wherein said second selector device comprises two push-buttons, disposed on either side of a "D" position of said first selector device, said push-buttons detecting deflections of said selector lever parallel to the given axis.

4. The device according to claim 1, wherein said first selector device and said second selector device are combined in a single selector device having two push-buttons located on a steering wheel.

5. The device according to claim 1, wherein said return circuit performs a return to the automatic mode if an engine speed reaches a lower speed threshold.

6. The device according to claim 1, wherein said return circuit performs a return to the automatic mode if one of a braking wheel slip, a driving wheel slip, and traveling through a curve is detected.

7. The device according to claim 1, wherein said return circuit performs a return to the automatic mode if a change over time in a gas pedal actuation exceeding a predefined value is detected.

8. The device according to claim 1, wherein said return circuit performs a return to the automatic mode if one of an activation of a navigation system, an activation of a traffic control system, a use of a car telephone, and a radio operating procedure is detected.

9. A device for controlling an automatic transmission of a motor vehicle, comprising:

an electronic control system, selectively operable in an automatic mode and a manual mode, for automatically determining a transmission ratio in the automatic mode as a function of an operating condition;

a first selector device for determining a driving stage of a transmission control in the automatic mode;

a second selector device for changing the transmission ratio step-wise in the manual mode; and a return circuit for switching said electronic control system into the automatic mode if a brake actuation duration being longer than a given duration is detected after a manual selection of the transmission ratio.

10. The device according to claim 9, wherein said first selector device includes a selector lever movable in a shift gate along a given axis, and wherein said second selector device includes two push-buttons, disposed on either side of a "D" position of said first selector device, said push-buttons detecting deflections of said selector lever in one of a direction perpendicular to the given axis and a direction parallel to the given axis.

11. The device according to claim 9, wherein said first selector device and said second selector device are combined in a single selector device having two push-buttons located on a steering wheel.

12. The device according to claim 9, wherein said return circuit performs a return to the automatic mode if an engine speed reaches one of an upper speed threshold and a lower speed threshold.

13. The device according to claim 9, wherein said return circuit performs a return to the automatic mode if one of a braking wheel slip, a driving wheel slip, and traveling through a curve is detected.

14. The device according to claim 9, wherein said return circuit performs a return to the automatic mode if a change over time in a gas pedal actuation exceeding a predefined value is detected.

15. The device according to claim 9, wherein said return circuit performs a return to the automatic mode if one of an activation of a navigation system, an activation of a traffic control system, a use of a car telephone, and a radio operating procedure is detected.

16. A device for controlling an automatic transmission of a motor vehicle, comprising:

an electronic control system, selectively operable in an automatic mode and a manual mode, for automatically determining a transmission ratio in the automatic mode as a function of an operating condition;

a first selector device for determining a driving stage of a transmission control in the automatic mode;

a second selector device for changing the transmission ratio step-wise in the manual mode; and a return circuit for switching said electronic control system into the automatic mode if a brake actuation frequency higher than a given frequency is detected after a manual selection of the transmission ratio.

17. The device according to claim 16, wherein said first selector device includes a selector lever movable in a shift gate along a given axis, and wherein said second selector device includes two push-buttons, disposed on either side of a "D" position of said first selector device, said push-buttons detecting deflections of said selector lever in one of a direction perpendicular to the given axis and a direction parallel to the given axis.

18. The device according to claim 16, wherein said first selector device and said second selector device are combined in a single selector device having two push-buttons located on a steering wheel.

19. The device according to claim 16, wherein said return circuit performs a return to the automatic mode if an engine speed reaches one of an upper speed threshold and a lower speed threshold.

20. The device according to claim 16, wherein said return circuit performs a return to the automatic mode if one of a braking wheel slip, a driving wheel slip, and traveling through a curve is detected.

21. The device according to claim 16, wherein said return circuit performs a return to the automatic mode if a change over time in a gas pedal actuation exceeding a predefined value is detected.

22. The device according to claim 16, wherein said return circuit performs a return to the automatic mode if one of an activation of a navigation system, an activation of a traffic control system, a use of a car telephone, and a radio operating procedure is detected.

* * * * *